Patented July 28, 1953

2,647,099

UNITED STATES PATENT OFFICE 2,647,099

LINEAR POLYESTER PLASTICIZERS

William Mayo Smith, Jr., Cuyahoga Falls, Ohio, assignor to The Firestone Tire & Rubber Company, Akron, Ohio, a corporation of Ohio No Drawing. Application November 8, 1951, Serial No. 255,539

18 Claims. (Cl. 260—31.6)

This invention relates to certain subresinous linear polyester plasticizers for vinyl chloride resins, and more particularly to the improvement of the heat-ageing behavior of these plasticizers when compounded with the resins.

It has been discovered by associates of the present applicant that certain subresinous linear polyesters of (A) an alkylene dicarboxylic acid with (B) a glycol and (C) a monohydric alcohol provide excellent plasticizers for vinyl chloride resins. Hereinafter these materials will be referred to as "linear polyesters." These linear polyesters have excellent efficiency as plasticizers, are not susceptible to excessive migration, and impart excellent low temperature properties to the resins in which they are incorporated. Such linear polyesters may be prepared in one of two ways—(1) by transesterification of an ester of the dicarboxylic acid with the glycol, or (2) by direct esterification of the free acid with the glycol and alcohol. Method (2) is by far the less expensive; unfortunately vinyl chloride resins containing polyesters produced by method (2) exhibit relatively poorer heat ageing than resins containing the polyesters produced by method (1).

Accordingly, it is an object of this invention to provide novel plasticized vinyl chloride resin compositions.

Another object is to provide such resins in which the plasticizer is a subresinous linear polyester.

Still another object is to provide subresinous linear polyester plasticizers which will impart good heat ageing properties to the vinyl chloride resins into which they are incorporated.

A still further object is to provide a process for treating subresinous linear polyesters to improve the heat ageing properties of the vinyl chloride resins into which they are incorporated.

SYNOPSIS OF THE INVENTION

The above and other objects are secured, in accordance with this invention, by contacting the subresinous linear polyesters produced by direct esterification of free carboxylic acids with glycols and with alcohols as discussed above, with an aqueous solution of sodium hydroxide, at temperatures from 10° to 60° C. and for a time of at least 4 hours. The sodium hydroxide should be of a concentration of from 0.1% to 10%, based on the weight of the solution. The resultant products, when incorporated into vinyl chloride resins, produce plasticized resinous compositions having excellent resistance to heat ageing as compared to otherwise similar compositions in which the polyester was not treated with sodium hydroxide solution.

THE SUBRESINOUS LINEAR POLYESTERS

These are moderately high molecular weight, but subresinous linear polyesters produced by condensing, under esterifying conditions:

| | Moles |
|---|---|
| (A) A free alkylene dicarboxylic acid containing from 4 to 12 carbon atoms | 2 |
| (B) A glycol or diglycol containing from 2 to 12 carbon atoms and | 1 |
| (C) An aliphatic or alkoxyaliphatic monohydric alcohol containing from 4 to 12 carbon atoms | 2 |

The molecular proportions in the above schedule may be varied by about ±0.1 mole in each case. If the reaction led to a single molecular species, it would have the formula

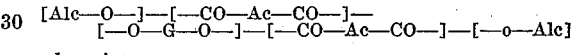

wherein

Also—O— represents a monohydric alcohol residue

—CO—Ac—CO— represents a dicarboxylic acid residue and

—O—G—O— represents a glycol residue

In actual fact, a wide variety of molecular species will be obtained, some with a large number of repeating units in the chain, and some with few, tending, as the esterification conditions are prolonged, to an ultimate thermodynamically predetermined distribution. These polyesters are generally of a viscosity about that of glycerine and may be characterized as of moderately high molecular weight but of subresinous character.

The acids which may be employed in the preparation of the esters may be any alkylene dicarboxylic acids containing from 4 to 12 carbon atoms, for example:

Table I

| | |
|---|---|
| Succinic acid | Azelaic acid |
| Glutaric acid | Suberic acid |
| Adipic acid | Undecanedicarboxylic acid |
| Pimaric acid | Dodecanedicarboxylic acid |
| Sebacic acid | |

The glycols and diglycols which may be employed may be any containing from 2 to 12 carbon atoms, for example

Table II

| | |
|---|---|
| Ethylene glycol | p-Xylene glycol |
| 1,2-propanediol | 1,5-pentanediol |
| 1,4-butanediol | 1,10-decanediol |
| Hexamethylene glycol | 2-methylpentanediol-1,3 |
| Diethylene glycol | Butanediol-1,3 |
| 2-methyl-2,4-pentanediol | 2-ethyl hexanediol-1,3 |
| 2,2'-dihydroxy dipropyl ether | |

The monohydric alcohol entering into the synthesis of the esters may be any aliphatic or alkoxyaliphatic alcohol containing from 4 to 12 carbon atoms such as

Table III

| | |
|---|---|
| n-Butanol | Iso-octanol |
| 2-ethyl hexanol | The nonyl alcohols derived from the "Oxo" process, i. e. hydrogenation of a mixture of carbon monoxide and hexenes. Largely 3,5,5-trimethyl hexanol |
| 2-butoxy ethanol | |
| 3-ethyl hexanol | |
| Capryl alcohol | |
| Dodecyl alcohol | |
| n-Octanol | |

The esterification of the acid, glycol and alcohol may be effected under any usual esterification conditions, typically by refluxing with a water-entraining solvent such as toluene. The water evolved is mechanically separated from the toluene before the latter is returned to the reaction mass. When water ceases to be evolved at an appreciable rate, the reaction mass is heated under reduced pressure to remove the solvent and remaining water and to drive the reaction further to completion.

The linear polyesters are generally incorporated in the vinyl chloride resins to the extent of from about 10% to 60%, based on the weight of the resins.

THE TREATMENT WITH AQUEOUS SODIUM HYDROXIDE

This treatment consists in agitating the polyester with an aqueous solution of sodium hydroxide containing from 0.1 to 10.0%, preferably about 4%, of sodium hydroxide, based on the weight of solution supplied. The volume of solution supplied should be at least one-half that of the polyester under treatment. The ingredients quickly form a very stable emulsion which is not easily broken until the treatment has been under way for a considerable period of time, which may vary upwards of 6 hours to about 20 hours, the time to this stage being an inverse function of the amount of sodium hydroxide employed, other factors being equal. The temperature during the agitation should be above about 10° C. and should not exceed 60° C.

As above stated, the treating solution should contain 0.1 to 10.0% of sodium hydroxide. As prepared, the polyesters are acidic, and if they are not preliminarily neutralized, they will consume a portion of the sodium hydroxide supplied. Only the portion of sodium hydroxide not so consumed should be considered as available to provide the desired sodium hydroxide concentration of 0.1 to 10.0% referred to above. The polyesters are considered to be neutralized when a pink coloration of phenolphthalein indicator can be observed for 10 seconds after the last addition of sodium hydroxide.

Referring to the phenomenon whereby the ingredients form a stable emulsion which ultimately spontaneously breaks upon cessation of agitation, it is preferred to operate the process for a sufficient length of time to bring about this break, both for convenience of operation and for optimum improvement in heat-ageing properties of the polyester. The treatment may of course be carried on for a less time, and the emulsion broken by salting-out, centrifugation or the like. The process should be carried out for at least 4 hours to obtain a worthwhile improvement in the polyester properties. There is no theoretical upper limit on the time of treatment, except that slow hydrolysis of the polyester occurs continuously and may become important if the treatment is continued long enough. For all practical purposes, there is no need of continuing beyond 30 hours agitation of the polyester and sodium hydroxide solution.

THE VINYL CHLORIDE RESINS

The vinyl chloride resins, which may be plasticized with the linear polymers treated in accordance with this invention, are a well-known class of materials consisting of simple polymers of vinyl chloride, and copolymers of vinyl chloride in which the essential polyvinyl chloride polymer chains are interspersed at intervals with the residues of other monoethylenically unsaturated compounds or conjugated diethylenically unsaturated compounds. In general, any resin having a substantial proportion of the polyvinyl chloride chain structure, so as to be susceptible to heat degradation by mechanisms involving the polyvinyl chloride chain will be benefitted by the addition of the treated linear polyesters of this invention. This will include any vinyl chloride copolymers containing not more than 40%, based on the total weight of the resins, of these extraneous unsaturated compounds.

Conversely stated, the resins must contain at least 60% of vinyl chloride copolymerized therein. Suitable compounds for copolymerization with vinyl chloride include, for instance, vinyl esters on the order of vinyl bromide, vinyl fluoride, vinyl acetate, vinyl chloroacetate, vinyl butyrate, other fatty acid vinyl esters, vinyl alkyl sulfonates and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate, and the like; vinylidene compounds on the order of vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like. For a fairly complete list of materials known to polymerize with vinyl chloride, reference may be had to Krczil, "Kurzes Handbuch der Polymerisations-Technik—II, Mehrstoff Polymerization," Edwards Bros. Inc., 1945, pp. 735–747, the items under "Vinyl chlorid." As a rough rule, the criterion of a practical comonomer for use with vinyl chloride to produce copolymers containing 60% or more of vinyl chloride is that, on a mole percentage basis, an initial charge of 96% vinyl chloride, balance comonomer, shall yield an initial copolymer containing (a) at least 90% vinyl chloride, and (b) not more than 99% vinyl chloride. On this basis, satisfactory comonomers for use with vinyl chloride will be those having "$Q_2$" and "$e_2$" values, as described in J. Polymer Science 2:101, correlated as follows, assuming for vinyl chloride $Q_{vinyl\ chloride}=.03$ and $e_{vinyl\ chloride}=.3$:

$$4.1 > \frac{\frac{.029 e^{-.3(.3-e_2)}}{Q_2} + .04}{1.33 Q_2 e^{e_2(.3-e_2)} + .96} > .37$$

Instead of the single unsaturated comonomers of the types above indicated, mixtures of such comonomers may enter into the copolymers, it being understood that the total quantity thereof shall be small enough (i. e., not over 40%, based on the weight of copolymer) that the essential character of the polyvinyl chloride chain is retained.

With the foregoing general discussion in mind, there are given herewith detailed examples of the practice of the invention. All parts given are by weight.

EXAMPLE I

| | |
|---|---|
| Diethyl glycol | 1061 g. (10 moles) |
| Adipic acid | 2923 g. (20 moles) |
| "Oxo" nonyl alcohols[1] | 2885 g. (20 moles) |
| Toluene | 500 ml. |

[1] Sold by E. I. du Pont de Nemours and Co. under the designation of nonyl alcohol. These are mixed alcohols, principally 3,5,5-trimethylhexanol (97.5% by weight), derived from the "Oxo" process, i. e., hydrogenation of a mixture of petroleum hexenes and carbon monoxide. Hereinafter referred to as "Oxo" nonyl alcohols.

The above materials were refluxed together for 24 hours, the water evolved being diverted from the reflux before return of the reflux to the body of the reactants. At the end of this time, the temperature of the reaction mass was 200° C., and the water evolved and diverted amounted to 705 ml. (98% of theory). The reaction mass was then stripped of volatile matter by heating under high vacuum, leaving a residue of 6100 grams of linear polyester (99.4% of theory). The polyester was then cooled. A 100-gram sample of the polyester required 26.4 ml. of 1 N sodium hydroxide solution to produce a 10-second pink end point with phenolphthalein.

To 5170 grams of the plasticizer (as obtained from the esterification reaction, without addition of any alkali) were added 5500 ml. of 1 N aqueous sodium hydroxide, and the mixture vigorously agitated for 18 hours at 25° C. Upon cessation of agitation, the white emulsion spontaneously separated, and the lower (aqueous) layer was siphoned off.

The polyester layer was washed with 8 liters of water. Separation was relatively slow and incomplete, and the water entrained in the plasticizer was finally distilled off under reduced pressure.

The resultant polyester product was incorporated into a vinyl chloride resin composition as follows:

| | Parts |
|---|---|
| Polyvinyl chloride (prepared in granular suspension in water) | 100 |
| Linear polyester product | 50 |
| Calcium stearate | 0.5 |
| Tricalcium phosphate | 1.0 |
| Silicate filler | 1.5 |
| Cadmium lauryl mercaptide | 2.0 |

The materials were compounded on a roll mill and sheeted off at a thickness of .025 inch. A strip of the sheet was hung in an oven at 170° C. for two hours, at the end of which time it possessed only a slight pale straw color. A similar composition, wherein the polyester had not been treated with alkali, became dark brown under the same test.

EXAMPLE II

| | |
|---|---|
| Butanediol-1,4 | 901.2 g. (10 moles) |
| Adipic acid | 2923 g. (20 moles) |
| "Oxo" nonyl alcohol | 2855 g. (20 moles) |
| Toluene | 500 ml. |

The above ingredients were refluxed together and stripped as described in the preceding example. There were obtained 5940 grams (99.3% of theory) of a crude linear polyester product.

To 5700 g. of this product were added 4000 ml. of 1 N aqueous sodium hydroxide solution, and the mixture stirred for 18 hours, at the end of which time it had assumed the form of a dirty yellow emulsion. Upon cessation of the stirring, an aqueous phase separated spontaneously and was removed. The remaining water was distilled off under reduced pressure, and the polyester was filtered to remove solid suspended matter. There was obtained 5450 g. (95.7% of theory) of product. A sheeted vinyl chloride resin composition, identical to that of the preceding example, but containing this treated polyester, rather than the polyester of Example I, showed only faint brown spots after 90 minutes' heat ageing at 170° C. A similar composition made from an untreated polyester turned a medium brown under the same test.

In order to further improve the sodium hydroxide treated polyester, 3760 grams thereof were agitated with 8 liters of water, and separated therefrom by decantation. The resultant polyester, when incorporated into a vinyl chloride resin composition sheet identical to that of Example I, but containing this polyester rather that that of Example I, showed only a faint straw coloration after 2 hours' exposure in an oven at 170° C.

EXAMPLE III.—VARIATION OF CONDITIONS

Linear polyesters were prepared in accordance with the esterification procedure of Examples I and II, down to, but not including, the washing with sodium hydroxide solution. Sodium hydroxide washing tests were run on a series of samples of each of the polyesters. In each test, a one-hundred gram portion of the polyester under test was agitated with a selected amount of 1 N sodium hydroxide solution, and for a selected time and temperature. The treated polyester was then washed with water, dried by heating under vacuum, and incorporated into a vinyl chloride composition sheet as described in Example I. Strips of the sheets were hung in an oven at 170° C. for two hours, and subjectively rated by the operator as to color. The experimental conditions and results are tabulated herewith.

Table IV

| Raw Polyester Treated (Constituents) | Ml. of 1 N NaOH per 100 g. polyester | Time of Treatment (hours) | Temperature of Treatment, °C. | Appearance of Strip after Exposure at 170° C. for 2 Hours |
|---|---|---|---|---|
| Adipic Acid ª plus Diethylene glycol plus "Oxo" nonyl alcohol. | no treatment | | | brown. |
| | 22.25 ᶜ (neutralized) | 15 | 25 | Do. |
| | 27.9 | 15 | 25 | tan. |
| | 33.5 | 15 | 25 | Do. |
| | 39.0 | 15 | 25 | light tan. |
| | 44.5 | 15 | 25 | Do. |
| | 22.25 ᶜ (neutralized) | 20 | 25 | brown. |
| | 33.5 | 20 | 25 | |
| | 44.5 | 20 | 25 | light straw, a few specks. |
| | 89 | 20 | 25 | |
| | 89 | 20 | 42 | |
| | 267 | 20 | 25 | light straw. |
| Adipic Acid ᵇ plus Butanediol-1,4 plus "Oxo" nonyl alcohol. | no treatment | | | brown. |
| | 4 ᶜ (neutralized) | 15 | 25 | straw. |
| | 16 | 15 | 25 | light straw. |
| | 32 | 15 | 25 | Do. |
| | 64 | 15 | 25 | Do. |

ª Prepared from the same recipe and according to the procedure of Example I.
ᵇ Prepared from the same recipe and according to the procedure of Example II.
ᶜ This amount of sodium hydroxide was just sufficient to render the ester neutral as indicated by a pink coloration of phenolphthalein persisting for 10 seconds.

EXAMPLE IV

Diethylene glycol _____ 12.9 pounds (40 moles)
2-ethyl hexanol _____ 11.48 pounds (40 moles)
Adipic acid _____ 6.44 pounds (20 moles)
Toluene _____ 2 liters The above ingredients were charged into a jacketed kettle provided with a reflux condenser having a water trap arranged to remove the water from the reflux. The batch was refluxed for 42 hours, the water removed amounting to 98% of the theoretical. The batch was then stripped at 200° C. under a pressure of 1 mm.

To 14.95 pounds of the crude polyester there were added 4380 ml. of 1 N aqueous sodium hydroxide solution. The mixture was stirred at 25° C. for 18 hours, and then permitted to separate for 8 hours. The treated polyester product exhibited excellent heat stability in vinyl chloride resin compositions.

EXAMPLE V

The procedure of Example IV was exactly repeated, using identical amounts of materials but replacing the 2-ethyl hexanol with Enjay isooctyl alcohol (marketed under this name by the Enjay Co., Inc.: a mixture of isomeric octanols produced by hydrogenation of a mixture of petroleum olefines and carbon monoxide. Specific gravity 20°/20° C., 0.830–0.834: boiling range 180°–200° C.). The water collected was only 83.5% of the theoretical amount, and the crude polyester product was rather acid, one hundred grams requiring 58 ml. of 1 N aqueous sodium hydroxide to neutralize to phenolphthalein.

To 13.5 pounds of the crude polyester were added 13 liters of 1 N aqueous sodium hydroxide solution, and the mixture stirred for 8 hours. The mixture separated into layers upon cessation of stirring, and the polyester layer was removed and stripped at 200° C. under 1 mm. pressure. The product exhibited excellent heat resistance when incorporated into vinyl chloride resin compositions.

EXAMPLE VI

Adipic acid _____ 12.9 pounds (40 moles)
2-ethyl hexanol _____ 11.48 pounds (40 moles)
Butanediol-1,4 _____ 3.97 pounds (20 moles)
Toluene _____ 2 liters The above ingredients were condensed together for 42 hours in the manner described in the preceding examples. A total of 1412 ml. (98.3% of theory) of water was collected, and 100 g. of the crude polyester product required 14.6 ml. of 1 N sodium hydroxide solution to neutralize to phenolphthalein.

To 11.5 pounds of the crude polyester were added 3.5 liters of 1 N aqueous sodium hydroxide solution, and the mixture stirred for 18 hours. The mixture separated freely upon cessation of stirring, and the aqueous phase was removed. The polyester product was stripped at 200° C. under 1 mm. pressure. The stripped product exhibited the same excellent heat ageing resistance characterizing the treated polyester products of the preceding examples.

EXAMPLE VII

The same amounts of reagents described in the preceding example were used, substituting Enjay isooctyl alcohol (marketed under this name by the Enjay Company, Inc.: a mixture of isomeric octanols produced by the hydrogenation of a mixture of petroleum olefines and carbon monoxide. Specific gravity 20/20° C., 0.830–0.834; boiling range 180°–200° C.) for 2-ethyl hexanol. Refluxing was for 40 hours, and 1420 ml. (98.7% of theory) of water were evolved. The crude product required 15 ml. of 1 N sodium hydroxide solution to neutralize 100 g. of polyester to phenolphthalein.

To 13.6 pounds of the crude polyester were added 4554 ml. of 1 N aqueous sodium hydroxide, and the same procedure of agitation, separation and stripping was followed as in the preceding example. The product had excellent heat stability in vinyl chloride resin compositions.

From the foregoing general description and detailed specific examples, it will be evident that this invention provides novel treated linear polyesters which impart excellent heat-ageing properties to vinyl chloride resins into which they may be incorporated. The treated polyesters have all of the excellent plasticising properties characteristic of the untreated polyesters. The process may be carried out by means of relatively simple and inexpensive equipment and with a minimum of technical supervision.

What is claimed is:

1. Process which comprises agitating together, at a temperature from 10° to 60° C., and for a time of at least 4 hours (A) an aqueous solution containing from 0.1 to 10.0% by weight of sodium hydroxide, with (B) a mixture of linear polyesters produced by esterifying together A free alkylene dicarboxylic acid containing 4-12 carbon atoms _____ 2
A diol selected from the group consisting of alkylene glycols and diglycols containing 2-12 carbon atoms _____ 1±0.1
A monohydric alcohol selected from the group consisting of alkanols and alkoxyalkanols containing 4-12 carbon atoms _____ 2±0.1

2. Process which comprises agitating together, at a temperature from 10° to 60° C., for a time of at least 4 hours and sufficiently long that the resultant emulsion spontaneously separates upon cessation of agitation, (A) an aqueous solution containing from 0.1 to 10.0% by weight of sodium hydroxide, with (B) a mixture of linear polyesters produced by esterifying together Moles
A free alkylene dicarboxylic acid containing 4-12 carbon atoms _____ 2
A diol selected from the group consisting of alkylene glycols and diglycols containing 2-12 carbon atoms _____ 1±0.1
A monohydric alcohol selected from the group consisting of alkanols and alkoxyalkanols containing 4-12 carbon atoms _____ 2±0.1

3. Process which comprises agitating together, at a temperature from 10° to 60° C., and for a time of at least 4 hours (A) an aqueous solution containing about 4% by weight of sodium hydroxide, with (B) a mixture of linear polyesters produced by esterifying together Moles
A free alkylene dicarboxylic acid containing 4-12 carbon atoms _____ 2
A diol selected from the group consisting of alkylene glycols and diglycols containing 2-12 carbon atoms _____ 1±0.1
A monohydric alcohol selected from the group consisting of alkanols and alkoxyalkanols containing 4-12 carbon atoms _____ 2±0.1

4. Process which comprises agitating together, at a temperature from 10° to 60° C., for a time of at least 4 hours and sufficiently long that the resultant emulsion spontaneously separates upon cessation of agitation (A) an aqueous solution containing from 0.1 to 10.0% by weight of sodium hydroxide with (B) a mixture of linear polyesters produced by esterifying together Moles
Adipic acid _____ 2
Diethylene glycol _____ 1±0.1
Mixed alcohols produced by hydrogenation of petroleum hexene in the presence of carbon monoxide _____ 2±0.1

5. Process which comprises agitating together, at a temperature from 10° to 60° C., for a time of at least 4 hours and sufficiently long that the resultant emulsion spontaneously separates upon cessation of agitation (A) an aqueous solution containing from 0.1 to 10.0% by weight of sodium hydroxide with (B) a mixture of linear polyesters produced by esterifying together Moles
Adipic acid _____ 2
Butanediol-1,4 _____ 1±0.1
Mixed alcohols produced by hydrogenation of petroleum hexene in the presence of carbon monoxide _____ 2±0.1

6. Process which comprises agitating together, at a temperature from 10° to 60° C., for a time of at least 4 hours and sufficiently long that the resultant emulsion spontaneously separates upon cessation of agitation (A) an aqueous solution containing from 0.1 to 10.0% by weight of sodium hydroxide with (B) a mixture of linear polyesters produced by esterifying together Moles
Adipic acid _____ 2
Diethylene glycol _____ 1±0.1
2-ethyl hexanol _____ 2±0.1

7. Process which comprises agitating together, at a temperature from 10° to 60° C., for a time of at least 4 hours and sufficiently long that the resultant emulsion spontaneously separates upon cessation of agitation (A) an aqueous solution containing from 0.1 to 10.0% by weight of sodium hydroxide with (B) a mixture of linear polyesters produced by esterifying together Moles
Adipic acid _____ 2
Diethylene glycol _____ 1±0.1
Iso-octyl alcohol _____ 2±0.1

8. Process which comprises agitating together, at a temperature from 10° to 60° C., for a time of at least 4 hours and sufficiently long that the resultant emulsion spontaneously separates upon cessation of agitation (A) an aqueous solution containing from 0.1 to 10.0% by weight of sodium hydroxide with (B) a mixture of linear polyesters produced by esterifying together Moles
Adipic acid _____ 2
Butanediol-1,4 _____ 1±0.1
Mixed alcohols produced by hydrogenation of petroleum hexene in the presence of carbon monoxide _____ 2±0.1

9. The linear polyesters produced by the process of claim 1.

10. The linear polyesters produced by the process of claim 4.

11. The linear polyesters produced by the process of claim 5.

12. The linear polyesters produced by the process of claim 6.

13. The linear polyesters produced by the process of claim 7.

14. The linear polyesters produced by the process of claim 8.

15. A heat-stable vinyl chloride resin composition plasticised by the linear polyester treated in accordance with claim 1.

16. A heat-stable vinyl chloride resin composition plasticised by the linear polyester treated in accordance with claim 4.

17. A heat-stable vinyl chloride resin composition plasticised by the linear polyester treated in accordance with claim 5.

18. A heat-stable vinyl chloride resin composition plasticised by the linear polyester treated in accordance with claim 6.

W. MAYO SMITH, Jr.

No references cited.